(12) United States Patent
Peterson

(10) Patent No.: US 12,196,882 B2
(45) Date of Patent: Jan. 14, 2025

(54) MULTI-SENSOR MODALITY TARGET FOR EVALUATING AUTONOMOUS VEHICLE SENSORS IN VARYING WEATHER CONDITIONS

(71) Applicant: GM Cruise Holdings LLC, San Francisco, CA (US)

(72) Inventor: Nicholas Peterson, Madison, AL (US)

(73) Assignee: GM Cruise Holdings LLC, San Francisco, CA (US)

( * ) Notice: Subject to any disclaimer, the term of this patent is extended or adjusted under 35 U.S.C. 154(b) by 226 days.

(21) Appl. No.: 18/093,293

(22) Filed: Jan. 4, 2023

(65) Prior Publication Data
US 2024/0219518 A1     Jul. 4, 2024

(51) Int. Cl.
| | |
|---|---|
| G01S 7/40 | (2006.01) |
| B60W 50/02 | (2012.01) |
| G01S 7/497 | (2006.01) |
| G01S 13/931 | (2020.01) |
| G01S 17/931 | (2020.01) |
| G01W 1/02 | (2006.01) |

(52) U.S. Cl.
CPC ........... *G01S 7/40* (2013.01); *B60W 50/0205* (2013.01); *G01S 7/497* (2013.01); *G01S 13/931* (2013.01); *G01S 17/931* (2020.01); *G01W 1/02* (2013.01); *B60W 2050/0215* (2013.01); *B60W 2420/408* (2024.01); *B60W 2555/20* (2020.02)

(58) Field of Classification Search
CPC .......... G01S 7/40; G01S 7/497; G01S 13/931; G01S 17/931; G01S 7/4086; G01W 1/02; B60W 50/0205; B60W 2050/0215; B60W 2420/408; B60W 2555/20
See application file for complete search history.

(56) References Cited

U.S. PATENT DOCUMENTS

| | | | |
|---|---|---|---|
| 10,942,045 B1 * | 3/2021 | Crawford | G01D 11/30 |
| 2012/0136510 A1 * | 5/2012 | Min | G01S 17/88 701/2 |
| 2019/0271767 A1 * | 9/2019 | Keilaf | G01S 17/931 |
| 2023/0278589 A1 * | 9/2023 | Sun | B62D 15/021 701/23 |
| 2023/0366993 A1 * | 11/2023 | Sun | G01S 17/931 |

FOREIGN PATENT DOCUMENTS

CN     114424083 A  *  4/2022  ........... G01S 17/36

* cited by examiner

*Primary Examiner* — Mary Cheung
(74) *Attorney, Agent, or Firm* — Michael DiCato

(57) ABSTRACT

Systems and techniques are provided for using a multi-sensor modality target to evaluate autonomous vehicle sensors. An example method can include identifying a sensor target panel based on a first set of Light Detection and Ranging (LiDAR) return signals corresponding to at least one retroreflective panel associated with the sensor target panel. In some aspects, the method can include transmitting a plurality of LiDAR beams directed toward the sensor target panel, wherein the sensor target panel includes a first sensor target region that is associated with a first reflectivity value and a second sensor target region that is associated with a second reflectivity value. In some cases, the method can include determining one or more LiDAR parameters based on a second set of LiDAR return signals corresponding to the sensor target panel.

20 Claims, 12 Drawing Sheets

MULTI-SENSOR MODALITY TARGET FOR EVALUATING AUTONOMOUS VEHICLE SENSORS IN VARYING WEATHER CONDITIONS

BACKGROUND

1. Technical Field

The present disclosure generally relates to autonomous vehicles, more specifically, to systems and techniques for using a multi-sensor modality target to evaluate autonomous vehicle sensors in varying weather conditions.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
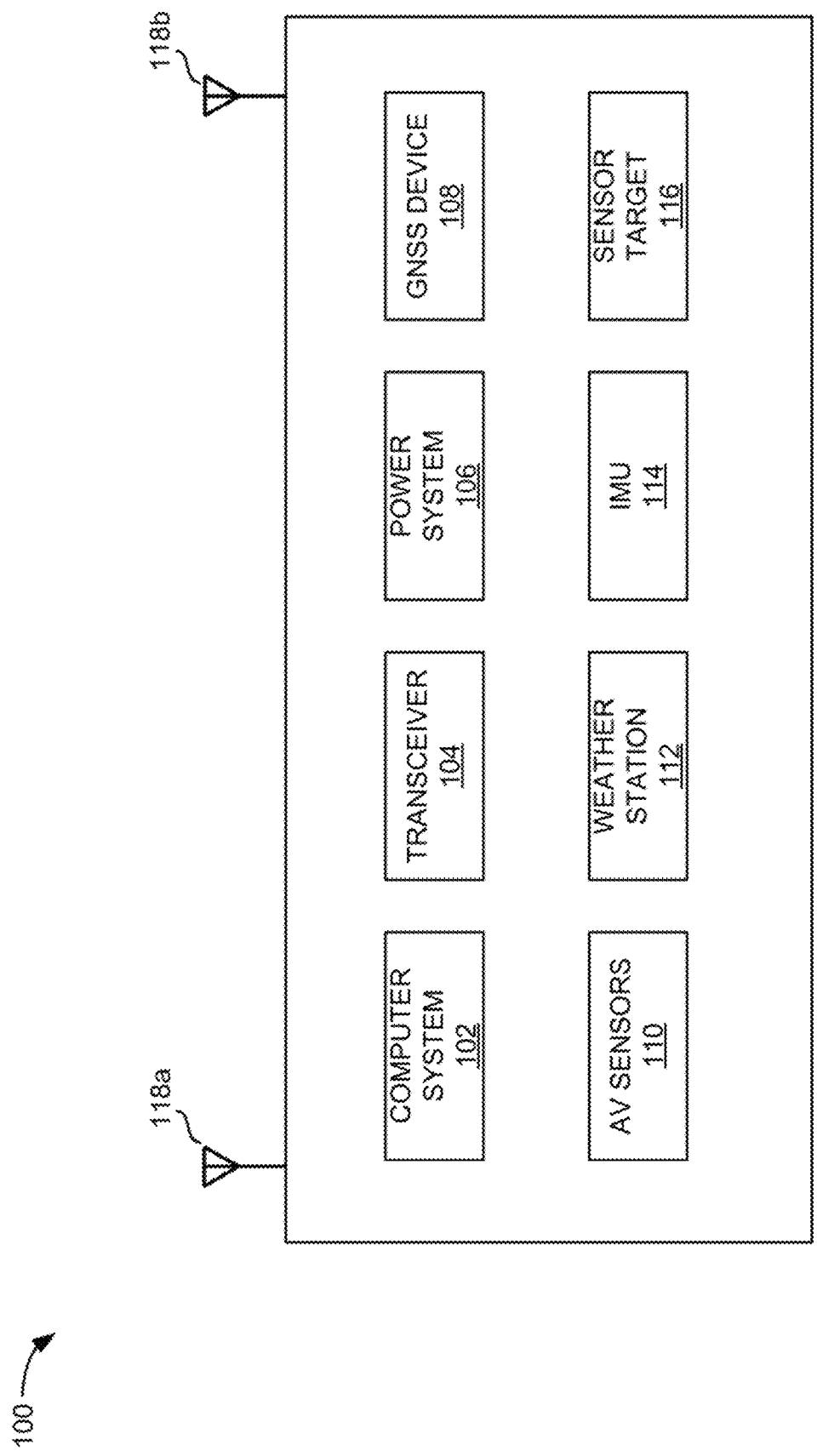
FIG. 1 illustrates an example system for evaluating autonomous vehicle sensors in varying weather conditions, according to some aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. Automation technology enables the AVs to drive on roadways and to perceive the surrounding environment accurately and quickly, including obstacles, signs, and traffic lights. In some cases, AVs can be used to pick up passengers and drive the passengers to selected destinations.

To ensure proper operation, AV sensors must be tested in varying weather conditions because the operation of sensors (e.g., Light Detection and Ranging (LiDAR) sensors, camera sensors, radar sensors, etc.) may vary depending on the weather conditions. For example, the range of a LiDAR device may be reduced in foggy or rainy conditions.

In some cases, simulating weather conditions in a lab environment for testing AV sensors may be unfeasible and/or may require expensive equipment along with large amounts of lab space. For example, a LiDAR sensor may be tested at distances that are greater than 200 meters (m) from a corresponding LiDAR target, which would require a very large and expensive weather simulation lab.

To avoid the drawbacks associated with lab testing, AV sensors may be tested using real-world environments. However, using real-world environments to test AV sensors in varying weather conditions presents further challenges. For example, weather can be unpredictable and can change quickly. Consequently, the desired weather conditions may change by the time a test is ready to be run and/or it may be difficult to configure a test in an area that exhibits the desired weather conditions. Furthermore, real-world environments are not controlled in a manner that is suitable for obtaining reliable data such as the data that is obtained in a controlled lab environment.

Systems and techniques are provided herein for testing AV sensors in varying weather conditions. In some aspects, a mobile test station that includes one or more AV sensors may be used to test the AV sensors in different (e.g., adverse) weather conditions. For example, the mobile test station may include one or more LiDAR sensors, camera sensors, Radio Detection and Ranging (RADAR) sensors, etc. that can be easily transported to any location. In some cases, the mobile test station may include one or more weather sensors that can be used to record weather conditions while taking AV sensor measurements.

In some aspects, the mobile test station may be used with a specialized sensor target that is configurable for testing different types of sensors. For example, the sensor target may include multiple regions having different reflectivity values suitable for testing LiDAR sensors. In some cases, the regions of the sensor target may be arranged in a manner that can also be used for testing camera sensors (e.g., slanted line for performing Mobile Transfer Function (MTF) testing). In some examples, the sensor target may include a RADAR reflector that can be used to test RADAR sensors.

Figure 2A:
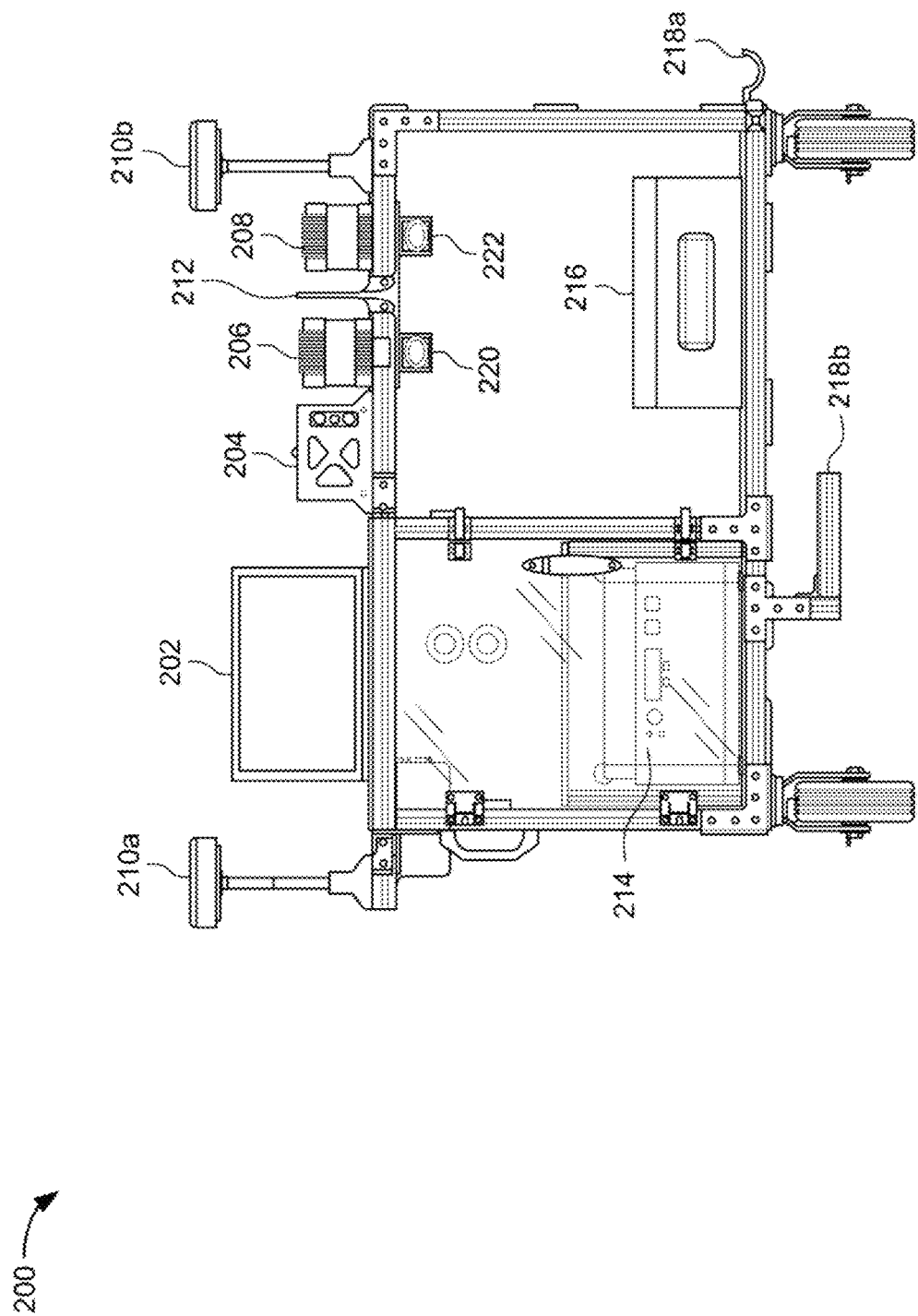
FIG. 2A illustrates a first perspective view of a mobile test station for evaluating autonomous vehicle sensors in varying weather conditions, according to some aspects of the present disclosure.
Figure 2B:
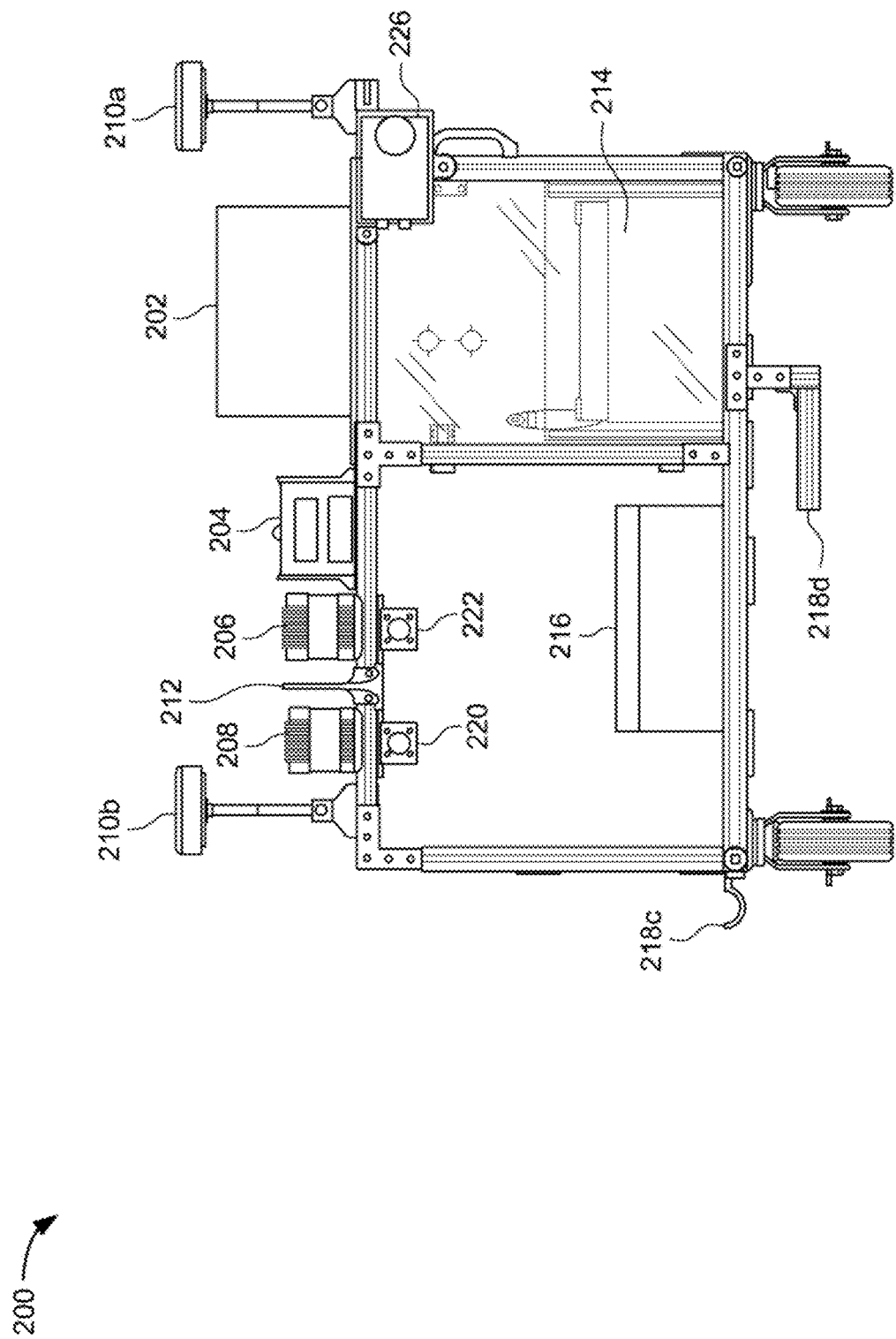
FIG. 2B illustrates a second perspective view of a mobile test station for evaluating autonomous vehicle sensors in varying weather conditions, according to some aspects of the present disclosure.

FIG. 1 illustrates an example of a system 100 that can be used to test autonomous vehicle (AV) sensors in varying weather conditions. In some cases, system 100 may correspond to a mobile test station for testing AV sensors (e.g., as illustrated in FIG. 2A and FIG. 2B). In some aspects, system 100 can include computer system 102. In some cases, computer system 102 may include components such as processors, memories, graphical user interfaces, input/output devices, etc. (e.g., computer system 102 may correspond to computing system 1000 illustrated in FIG. 10 and described further herein). In some configurations, computer system 102 may interface with and/or control one or more of the components in system 100. For instance, computer system 102 may be coupled to transceiver 104, power system 106, Global Navigation Satellite System (GNSS) device 108, AV sensors 110, weather station 112, and/or Inertial Measurement Unit 114.

In some aspects, system 100 can include transceiver 104. In some instances, transceiver 104 may be used to transmit and/or receive data using one or more communication protocols. For example, transceiver 104 may include a Bluetooth® transceiver, a WIFI transceiver, a cellular transceiver (e.g., 4G, 5G, etc.), a near field communication (NFC) transceiver, any other type of transceiver, and/or any combination thereof. In some cases, antenna 118a and/or antenna 118b may be coupled to transceiver 104 and may be used to transmit/receive radio frequency (RF) signals.

In some cases, system 100 can include power system 106. In some examples, power system 106 can be used to provide power to one or more components within system 100. For example, power system 106 can provide power to computer system 102, transceiver 104, GNSS device 108, AV sensors 110, weather station 112, and/or IMU 114. In some aspects, power system 106 may include one or more batteries. In some cases, power system 106 can include one or more circuits that can be used to recharge one or more batteries. For example, power system 106 may include a solar panel and corresponding circuitry that can be used to collect solar energy for charging one or more batteries.

In some aspects, system 100 can include GNSS device 108. In some cases, GNSS device 108 may include a Global Positioning System (GPS) device. In some examples, GNSS device 108 may be coupled to one or more GPS antennas (e.g., antenna 118a and/or antenna 118b). In some instances, GNSS device 108 may be used to determine the absolute location of system 100. In some examples, GNSS device 108 can be used to determine the relative location of system 100. For instance, GNSS device 108 can be used to determine the location of system 100 relative to one or more sensor targets (e.g., sensor target 116).

In some examples, system 100 can include one or more AV sensors 110. For instance, AV sensors 110 can include one or more LiDAR sensors, camera sensors, RADAR sensors, and/or any other type of AV sensor (e.g., sensor system 904-908 as described in connection with FIG. 9).

In some configurations, system 100 can include a weather station 112. In some cases, weather station 112 can include one or more weather sensors that can be used to identify or determine one or more weather conditions. For example, weather station 112 may include a thermometer, a barometer, a hygrometer, an anemometer, a pyranometer, a rain gauge, a windsock, a wind vane, a present weather sensor, a disdrometer, a transmissometer, a ceilometer, any other type of weather sensor, and/or any combination thereof. In some cases, weather station 112 can be used to monitor weather conditions including, but not limited to detecting certain weather events, such as rainfall (e.g., total rainfall in a time period), rain rate (e.g., millimeters of rain per minute), fog, visibility, wind speed, wind direction, wind chill, ultraviolet (UV) index, dew point, snow, sun, hail, lightning, humidity level, temperature, cloudiness, and/or any combination thereof.

In some aspects, system 100 can include an IMU 114. In some cases, computer system 102 can use data from IMU 114 to determine the position or pose of system 100. For example, IMU 114 can be used with GNSS device 108 to determine the position of system 100 relative to a sensor target. In some cases, the position of IMU 114 relative to AV sensors 110 (e.g., as configured on a mobile test station) can be used to determine the position of an AV sensor that is under test relative to a sensor target.

In some examples, system 100 can include sensor target 116. In some instances, sensor target 116 may include a target that is configured to test a LiDAR sensor (e.g., based on a reflectivity value). In some cases, sensor target 116 may include a target that is configured to test a camera sensor (e.g., spilled coins target, slanted edge target, etc.). In some aspects, sensor target 116 may include a target that is configured to test a RADAR sensor (e.g., a RADAR reflector). Further details regarding sensor target 116 are discussed herein in connection with FIG. 3A, FIG. 3B, and FIG. 4.

In some aspects, computer system 102 can be configured to simultaneously collect data (e.g., measurements) from one or more AV sensors 110. In some cases, computer system 102 can collect weather data from weather station 112. In some examples, computer system 102 can correlate measurements obtained from AV sensors 110 with weather data from weather station 112. For example, in testing a LiDAR sensor, computer system 102 may collect data that includes range, range precision, range minimum, range maximum, intensity, intensity precision, probability of default for the region of interest (ROI), number of returns (e.g., for a sensor target or target section), etc. In some aspects, computer system 102 may simultaneously collect weather data (e.g., via weather station 112) and computer system 102 may associate the LiDAR data with one or more corresponding weather conditions. In one illustrative example, LiDAR range values may be associated with the rainfall rate during the measurement.

In another example related to testing a camera sensor, computer system 102 may collect data that includes qualitative image frames, modulation transfer function (MTF) measurements (e.g., MTF plot, MTF50, MTF50P, MTF at Nyquist rate, MTF at ½ Nyquist rate, MTF at ¼ Nyquist rate, etc.), resolution of a slanted edge target, resolution of spilled coins target, etc. In some aspects, the camera sensor data may correspond to RAW format or to JPEG format. In some instances, computer system 102 may simultaneously collect weather data (e.g., via weather station 112) and associate camera sensor data with one or more corresponding weather conditions.

In another example related to testing a RADAR sensor, computer system 102 may collect data that includes range, magnitude of returns, number of returns, etc. In some cases, computer system 102 may simultaneously collect weather data (e.g., via weather station 112) and computer system 102 may associate RADAR sensor data with one or more corresponding weather conditions.

In some examples, the AV sensor data collected by computer system 102 may be used to improve the operation of an AV. For instance, the AV sensor data may be used to calibrate or optimize the operation of the AV perception stack (e.g., perception stack 912 discussed in connection with FIG. 9 below). For example, the accuracy of a LiDAR sensor may be degraded in certain fog or rainy conditions and the AV perception stack may consequently have a lower confidence score or weight applied to a measurement from LiDAR sensor in such weather conditions.

FIG. 2A illustrates a front perspective view of mobile test station 200 for evaluating autonomous vehicle (AV) sensors in varying weather conditions. In some aspects, mobile test station 200 may include one or more of the components in system 100. For example, mobile test station 200 can include computer system 202 that can be used to control one or more AV sensors such as RADAR sensor 204, LiDAR sensor 206, LiDAR sensor 208, camera sensor 220 and/or camera sensor 222.

In some aspects, mobile test station 200 may include one or more antennas such as antenna 210a and/or antenna 210b. In some cases, antenna 210a and/or antenna 210b may correspond to a GNSS antenna that can be used to determine the location (e.g., absolute location and/or relative location) of mobile test station 200.

In some configurations, mobile test station 200 may include networking system 216. In some instances, networking system 216 may include one or more components (e.g., processors, transceivers, memories, routers, switches, etc.) for providing network connectivity to mobile test station 200. For example, networking system 216 may include a WIFI router, a Bluetooth® module, a cellular transceiver, etc.

In some cases, mobile test station 200 may include power system 214. As noted above with respect to power system 106, power system 214 can include one or more batteries configured to provide power to different components of mobile test station 200. For example, power system 214 can provide power to computer system 202, RADAR sensor 204, LiDAR sensor 206, LiDAR sensor 208, camera sensor 220, camera sensor 222, and/or networking system 216.

In some examples, mobile test station 200 may include one or more mechanical components (e.g., latches, fasteners, handles, clasps, etc.). For example, mobile test station 200 may include support member 218a and support member 218b configured to support one side of a sensor target (e.g., sensor target 116). In some cases, corresponding support members (e.g., support member 218c and support member 218d) may be located on the other side of mobile test station 200 to support a second side of a sensor target. In some instances, mobile test station 200 may include divider 212 configured to isolate LiDAR signals from LiDAR sensor 206 and LiDAR sensor 208.

FIG. 2B illustrates a rear perspective view of mobile test station 200 for evaluating AV sensors in varying weather conditions. In some examples, mobile test station 200 may include inertial measurement unit (IMU) 226. In some cases, IMU 226 can be used to determine the position of mobile test station 200. In some aspects, the distance between IMU 226 and the AV sensors (e.g., RADAR sensor 204, LiDAR sensor 206, LiDAR sensor 208, camera sensor 220 and/or camera sensor 222) can be used to determine the position of an AV sensor relative to a sensor target. In some examples, IMU 226 and/or a GNSS module (not illustrated) can be used to determine the distance and the yaw angle between mobile test station 200 and a sensor target.

Figure 3A:
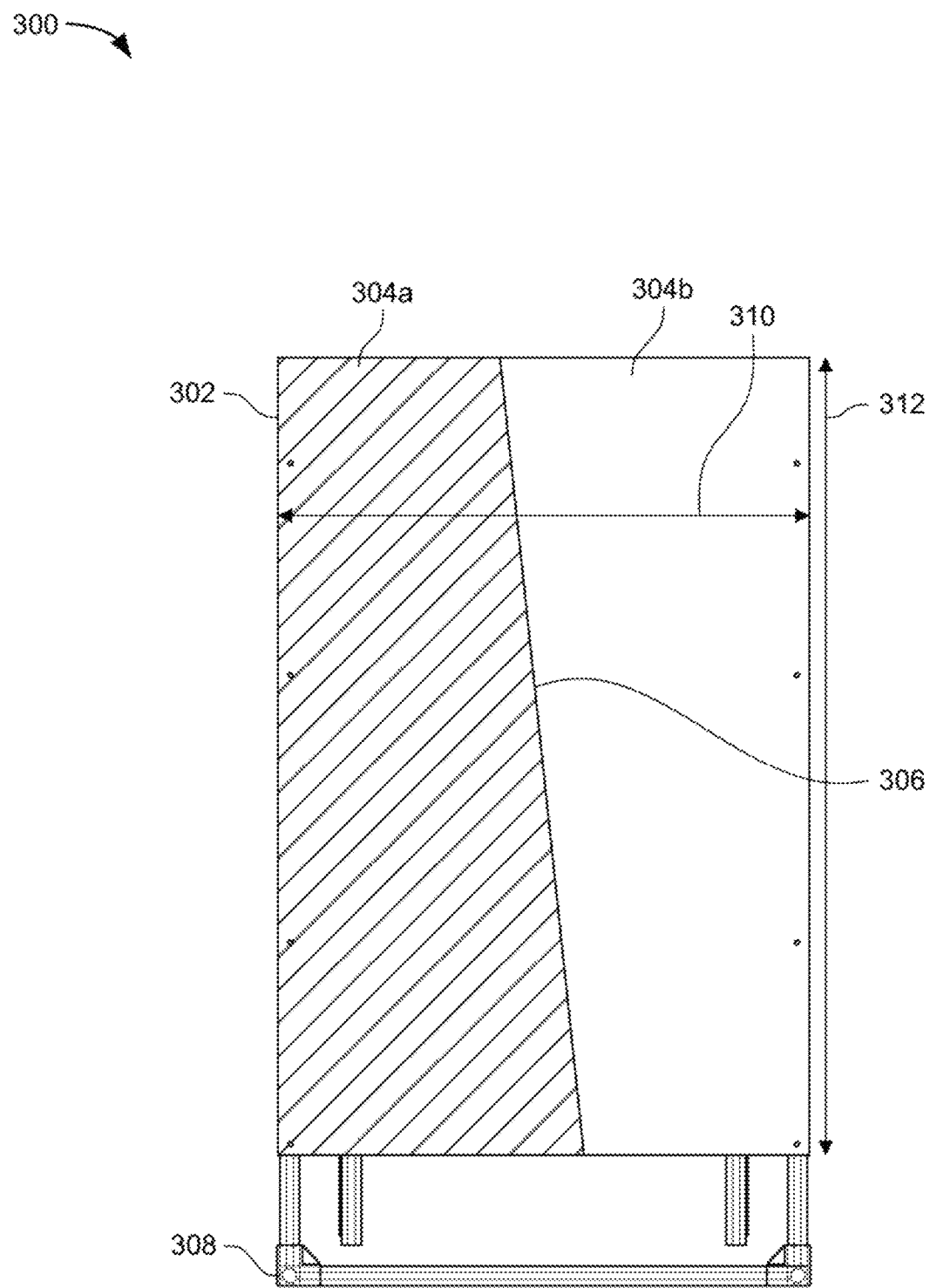
FIG. 3A illustrates a first view of a sensor target that can be used to evaluate autonomous vehicle sensors in varying weather conditions, according to some aspects of the present disclosure.

FIG. 3A illustrates a first view of a sensor target 300 that can be used to evaluate autonomous vehicle sensors in varying weather conditions. In some aspects, sensor target 300 can include a target panel 302 (e.g., board, sheet, etc.). In some cases, target panel 302 may include one or more target regions that can be associated with different reflectivity values (e.g., for testing LiDAR sensors). For example, target panel 302 may include target region 304a and target region 304b. In some cases, target region 304a may include a matte black vinyl material having a reflectivity that is relatively low (e.g., less than or equal to 10%). In some examples, target region 304b may include a matte white vinyl material having a reflectivity that is relatively high (e.g., greater than or equal to 60%).

In some cases, sensor target 300 may include a slanted line 306 that separates target region 304a and target region 304b. In some examples, slanted line 306 can be at an angle that is greater than or equal 6 degrees from a vertical axis corresponding to sensor target 300. In some configurations, slanted line 306 can be used to configure sensor target 300 as a slanted edge target for testing camera sensors.

Figure 3B:
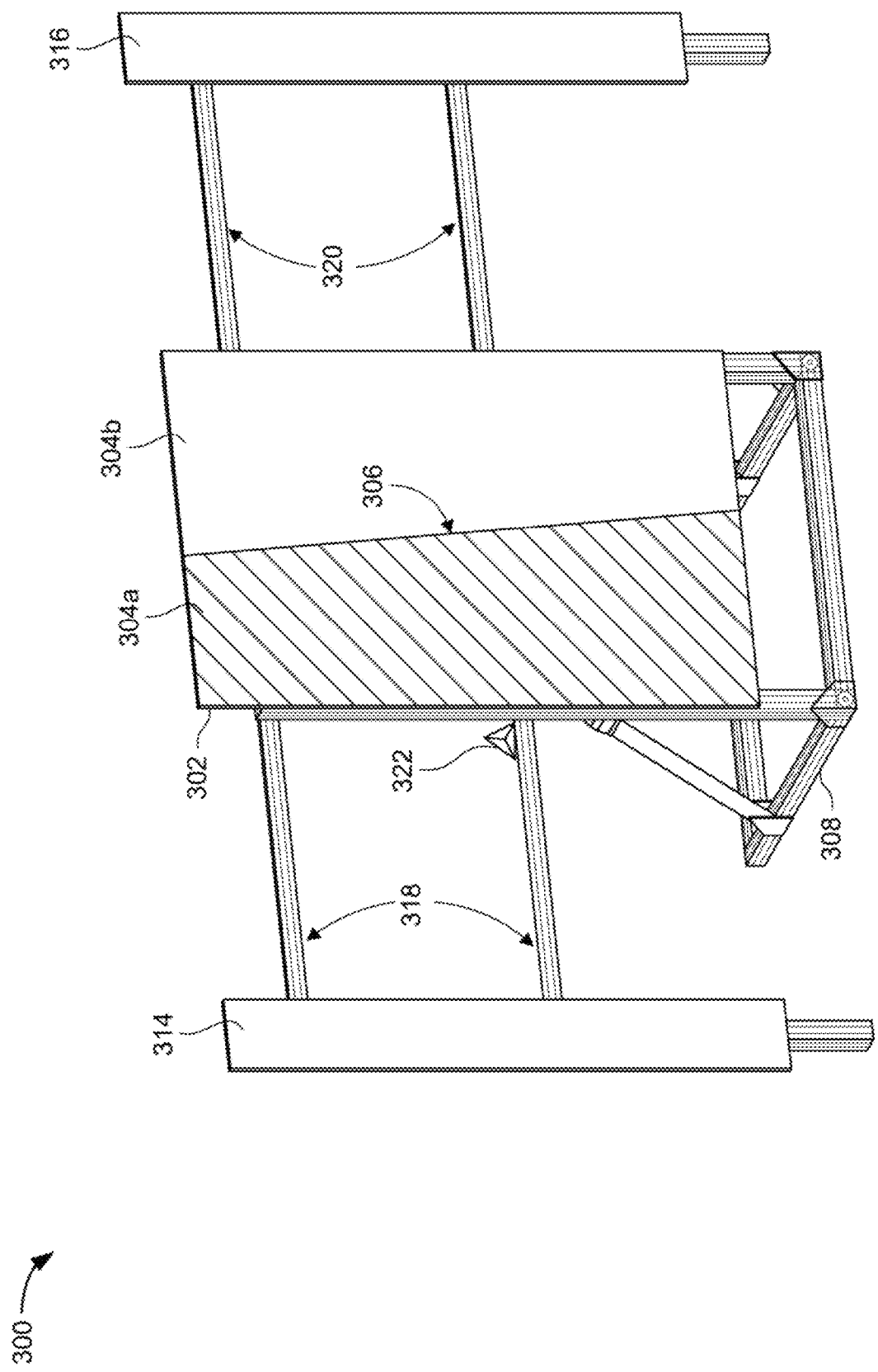
FIG. 3B illustrates a second view of a sensor target that can be used to evaluate autonomous vehicle sensors in varying weather conditions, according to some aspects of the present disclosure.

In some examples, sensor target 300 may include one or more support members such as support member 308. In some cases, sensor target 300 may be foldable or collapsible to facilitate transportation (e.g., as illustrated in FIG. 3B, support member 308 may fold behind sensor target 300). In one illustrative example, sensor target 300 may have a width 310 that is approximately 1 meter and a height 312 that is approximately 1.5 m. In some instances, sensor target may be formed using non-metallic materials (e.g., target panel 302 and support member 308 can be made using plastic, fiber glass, etc.).

FIG. 3B illustrates a second view of a sensor target 300 that can be used to evaluate autonomous vehicle sensors in varying weather conditions. In some cases, the view of sensor target 300 in FIG. 3B may correspond to an unfolded configuration in which support member 308 is in a downward position. In some cases, sensor target 300 can include one or more retroreflective panels that are coupled to either side of target panel 302. For example, sensor target 300 can include retroreflective panel 314 that is coupled to the left side of target panel 302 (e.g., via support structure 318) and retroreflective panel 316 that is coupled to the right side of target panel 302 (e.g., via support structure 320).

In some cases, retroreflective panel 314 and/or retroreflective panel 316 can be used to identify the location of sensor target 300 and/or of target panel 302. For example, computer system 202 can use a LiDAR sensor (e.g., LiDAR sensor 206 and/or LiDAR sensor 208) to determine the location of target panel 302 based on the intensity measurements associated with LiDAR beams that are reflected from retroreflective panel 314 and/or retroreflective panel 316. That is, the location or position of target panel 302 can be determined based on the location of retroreflective panel 314 and/or retroreflective panel 316 (e.g., computer system 302 may be configured with the distance between target panel 302 and retroreflective panel 314).

In some cases, the distance between retroreflective panel 314 and target panel 302 can be approximately 0.75 meters. In some instances, the distance between retroreflective panel 316 and target panel 302 can also be 0.75 meters. In some examples, retroreflective panel 314 and retroreflective panel 316 may be formed using a non-metallic material (e.g., diamond grade reflective material). In some configurations, support structure 318 may include a hinge or pivot point that facilitates folding retroreflective panel 314 to the side or behind target panel 302. In some cases, support structure 320 may include a hinge or pivot point that facilitates folding retroreflective panel 316 to the side or behind target panel 302.

In some instances, sensor target 300 may include RADAR reflector 322. In some examples, RADAR reflector 322 may be the only metallic component that is part of sensor target 300. In some aspects, RADAR reflector 322 may be used to test RADAR sensors. In some cases, RADAR reflector 322 may correspond to a 10 decibels per square meter (dBsm) corner reflector. In some examples, RADAR reflector 322 may be positioned at a height that is approximately 1 meter from the ground.

Figure 4:
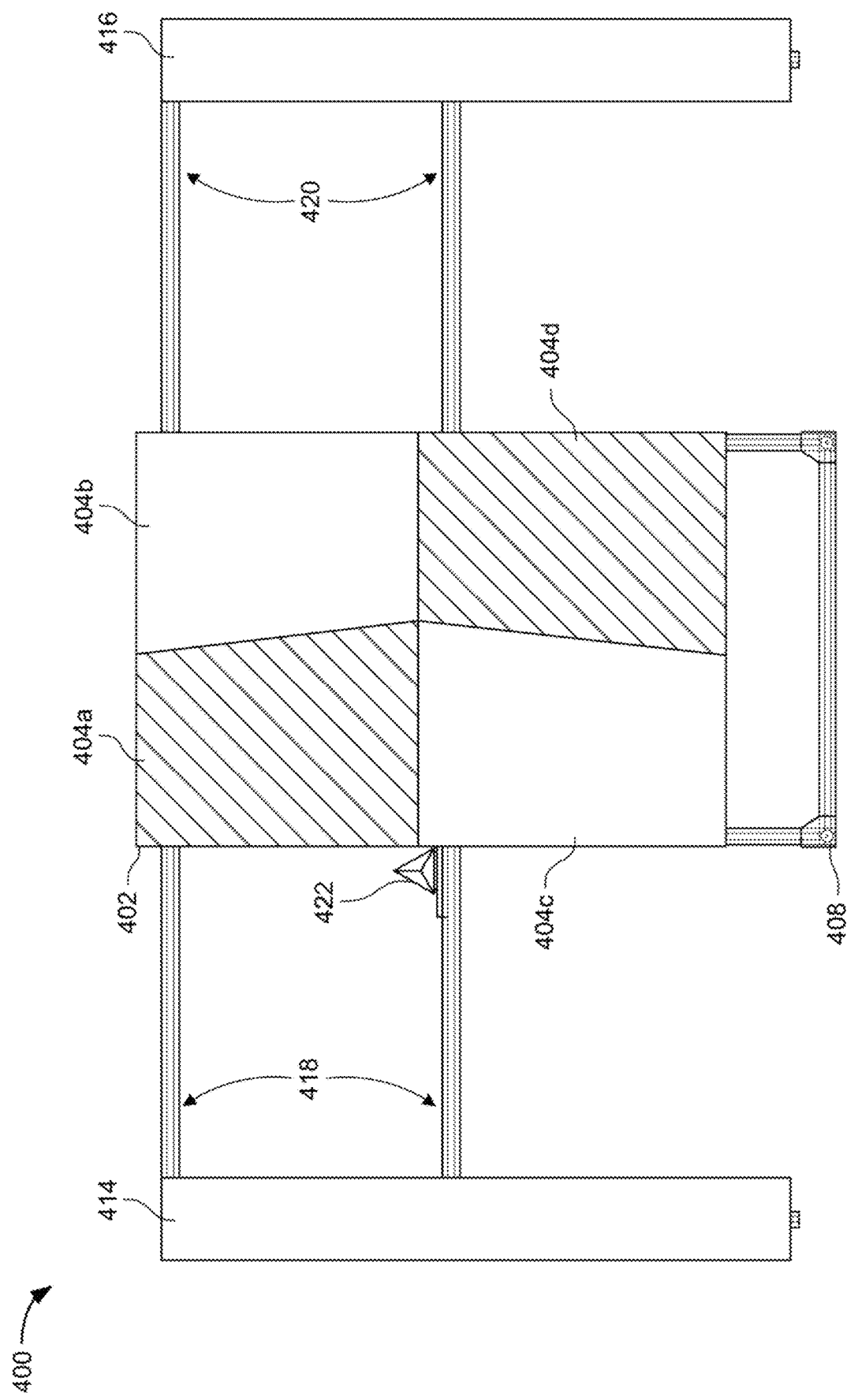
FIG. 4 illustrates another example of a sensor target that can be used to evaluate autonomous vehicle sensors in varying weather conditions, according to some aspects of the present disclosure.

FIG. 4 illustrates another example of a sensor target 400 that can be used to evaluate autonomous vehicle sensors in varying weather conditions. In some aspects, sensor target 400 can include a target panel 402 (e.g., board, sheet, etc.). In some cases, target panel 402 may include one or more target regions that can be associated with different reflectivity values (e.g., for testing LiDAR sensors). For example, target panel 402 may include target region 404a, target region 404b, target region 404c, and target region 404d. In some cases, target region 404a and target region 404d may include a matte black vinyl material having a reflectivity that is relatively low (e.g., less than or equal to 10%). In some examples, target region 404b and target region 404c may include a matte white vinyl material having a reflectivity that is relatively high (e.g., greater than or equal to 60%).

In some cases, sensor target 400 can include one or more retroreflective panels that are coupled to either side of target panel 402. For example, sensor target 400 can include retroreflective panel 414 that is coupled to the left side of target panel 402 (e.g., via support structure 418) and retroreflective panel 416 that is coupled to the right side of target panel 402 (e.g., via support structure 420). As noted with respect to sensor target 300, in some cases, retroreflective panel 414 and/or retroreflective panel 416 may be folded back to facilitate transportation and storage of sensor target 400. Similarly, support member 408 may also be folder or collapsed to a position behind target panel 402 to facilitate storage and/or transportation of sensor target 400.

In some instances, sensor target 400 may include RADAR reflector 422. As noted above with respect to RADAR reflector 322, RADAR reflector 422 may be used to test AV RADAR sensors.

Figure 5:
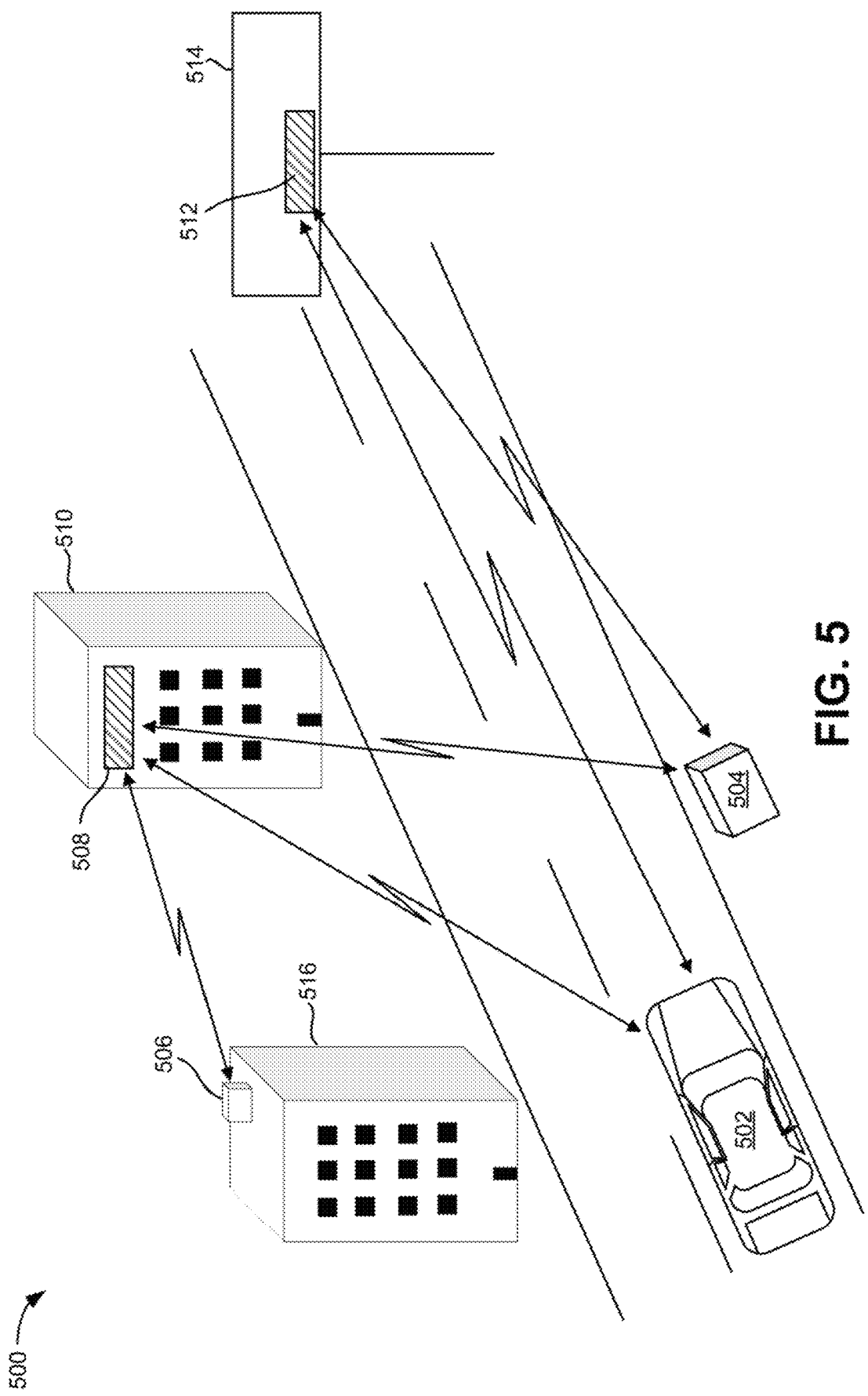
FIG. 5 illustrates an example system for performing long range sensor testing for autonomous vehicle sensors in varying weather conditions, according to some aspects of the present disclosure.

FIG. 5 illustrates an example system 500 for performing long range sensor testing for autonomous vehicle sensors in varying weather conditions. In some aspects, system 500 may include AV 502 having one or more AV sensors (e.g., LiDAR sensors, camera sensors, RADAR sensors, etc.). Alternatively, or in addition to AV 502, system 500 may include mobile test station 504 having one or more AV sensors (e.g., mobile test station 504 may correspond to mobile test station 200). Alternatively, or in addition to AV 502 and/or mobile test station 504, system 500 may include rooftop test station 506 positioned on the roof of building 516 having one or more AV sensors. In some aspects, rooftop test station 506 may include one or more of the components of mobile test station 200.

In some cases, long range AV sensor testing in adverse weather conditions can be performed by AV 502, mobile test station 504, and/or rooftop test station 506. For example, AV 502, mobile test station 504, and/or rooftop test station 506 may use sensor target 508 that is positioned on the side of building 510 to perform long range AV sensor testing. In another example, AV 502, mobile test station 504, and/or rooftop test station 506 may use sensor target 512 that is positioned on billboard 514 to perform long range AV sensor testing. In some aspects, the position of sensor target 508 and/or sensor target 512 can be configured to have a line-of-sight distance that is suitable for performing long range AV sensor testing. For example, the line-of-sight distance associated with sensor target 508 and/or sensor target 512 can be greater than or equal to 100 meters.

In some cases, sensor target 508 and/or sensor target 512 may include one or more components of sensor target 300 and/or sensor target 400. For example, sensor target 508 and/or sensor target 512 may include sensor target regions having different reflectivity values suitable for testing AV LiDAR sensors. In some cases, sensor target 508 and/or sensor target 512 may include a slanted line configuration suitable for testing AV camera sensors. In some aspects, sensor target 508 and/or sensor target 512 may include a RADAR reflector suitable for testing AV RADAR sensors.

Figure 6:
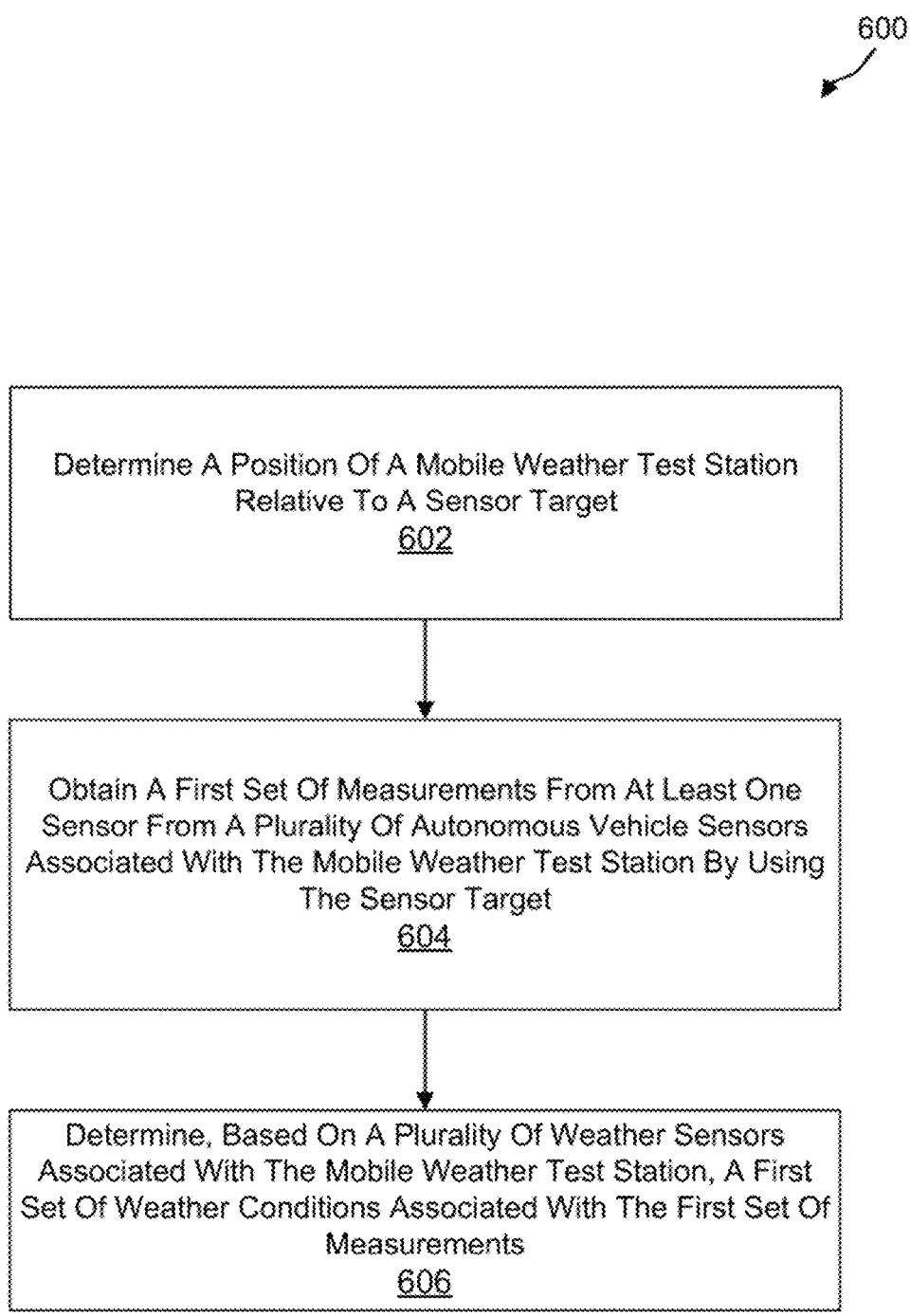
FIG. 6 illustrates an example of a process for using a mobile test station to evaluate autonomous vehicle sensors in varying weather conditions, according to some aspects of the present disclosure.

FIG. 6 illustrates an example of a process 600 for using a mobile test station to evaluate autonomous vehicle sensors in varying weather conditions. At block 602, the process 600 includes determining a position of a mobile weather test station relative to a sensor target. In some configurations, the sensor target can include at least one of an optical calibration target, a fiducial, and a reflector. For example, computer system 202 can determine the position or location of mobile test station (e.g., relative to sensor target 300) based on data from a GNSS device associated with mobile test station 200. In another example, computer system 202 can determine the position or location of mobile test station 200 based on data from one or more sensors (e.g., RADAR sensor 204, LiDAR sensor 206, LiDAR sensor 208, camera sensor 220, camera sensor 222, IMU 226, and/or any combination thereof). For example, computer system 202 can analyze data from one or more sensors in relation to known features in a high-definition map to determine the position or location of mobile test station 200.

In some cases, the position of the mobile weather test station is based on data from an inertial measurement unit (IMU) associated with the mobile weather test station. For example, the position of mobile test station 200 can be based on data from IMU 226.

At block 604, the process 600 includes obtaining a first set of measurements from at least one sensor from a plurality of autonomous vehicle sensors associated with the mobile weather test station by using the sensor target. In some aspects, the plurality of AV sensors includes at least one of a Light Detection and Ranging (LiDAR) device, a camera sensor, and a Radio Detection and Ranging (RADAR) sensor. For instance, computer system 202 can obtain measurements from AV sensors (e.g., RADAR sensor 204, LiDAR sensor 206, LiDAR sensor 208, camera sensor 220, and/or camera sensor 222) by using sensor target 300.

At block 606, the process 600 includes determining, based on a plurality of weather sensors associated with the mobile weather test station, a first set of weather conditions associated with the first set of measurements. For example, computer system 202 can determine a set of weather conditions associated with the sensor measurements based on data from weather sensors (e.g., weather station 112). In some aspects, the plurality of weather sensors includes at least one of a thermometer, a barometer, a hygrometer, an anemometer, a pyranometer, a rain gauge, a windsock, a wind vane, a present weather sensor, a disdrometer, a transmissometer, and a ceilometer.

In some examples, process 600 may include obtaining a second set of measurements from the at least one sensor from the plurality of autonomous vehicle sensors by using the sensor target; determining, based on the plurality of weather sensors, a second set of weather conditions associated with the second set of measurements; and determining a difference between the first set of measurements and the second set of measurements. For example, computer system 202 may obtain a second set of measurements from an AV sensor (e.g., RADAR sensor 204, LiDAR sensor 206, etc.) and determine a second set of weather conditions associated with the second set of measurements (e.g., based on data from weather station 112). In some cases, computer system 202 may determine a difference between the first set of measurements and the second set of measurements. For example, computer system 202 may determine that LiDAR sensor 206 reported a different range value in the different tests.

In some cases, process 600 may include identifying, based on the first set of weather conditions and the second set of weather conditions, at least one weather condition associated with the difference between the first set of measurements and the second set of measurements. For example, computer system 202 may determine that a rainy weather condition may have caused the difference between the first set of measurements and the second set of measurements.

Figure 7:
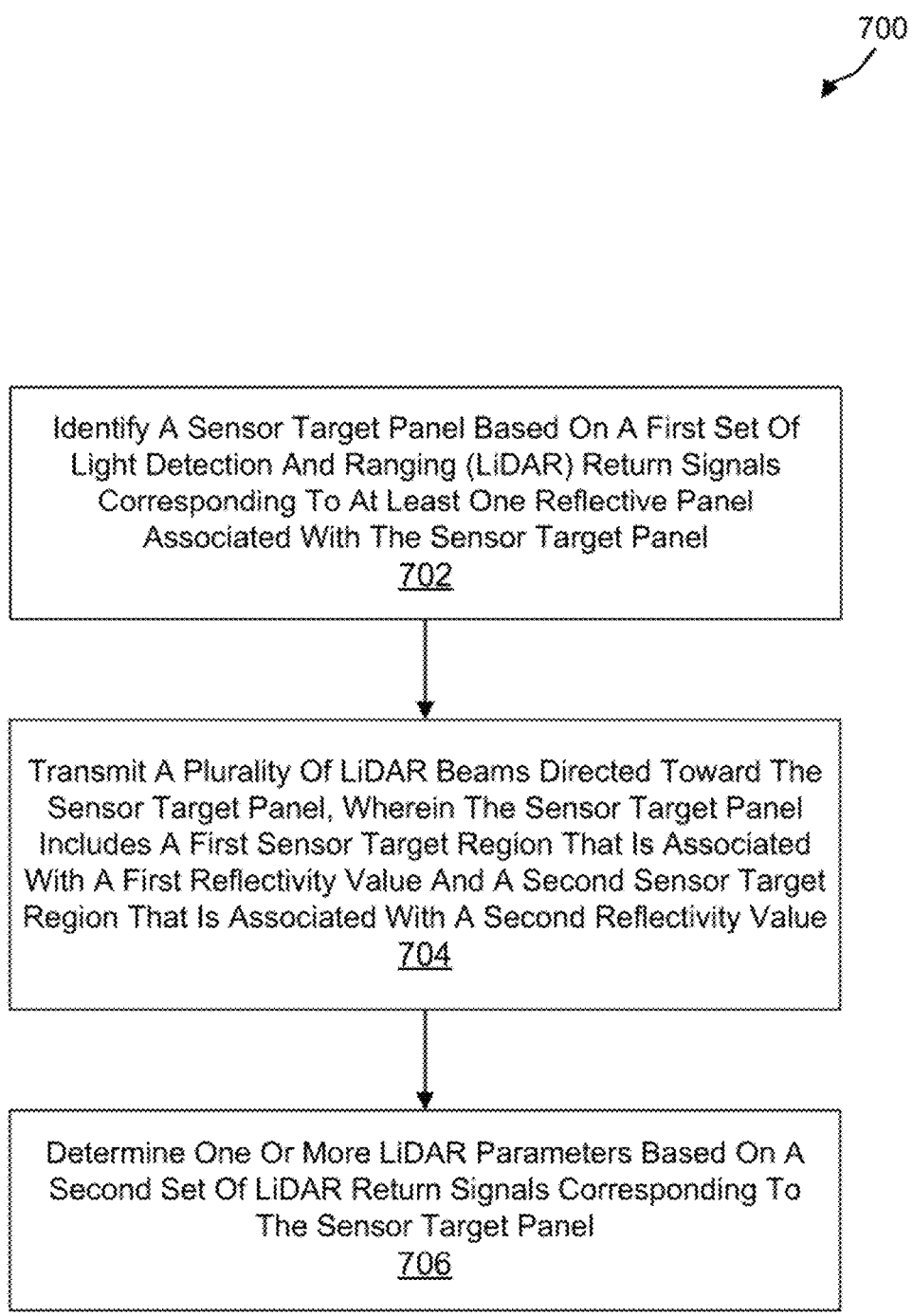
FIG. 7 illustrates an example of a process for using a sensor target to evaluate autonomous vehicle sensors in varying weather conditions, according to some aspects of the present disclosure.

FIG. 7 illustrates an example of a process 700 for using a sensor target to evaluate autonomous vehicle sensors in varying weather conditions. At block 702, the process 700 includes identifying a sensor target panel based on a first set of Light Detection and Ranging (LiDAR) return signals corresponding to at least one retroreflective panel associated with the sensor target panel. For example, computer system 202 can identify sensor target 300 based on LiDAR return signals corresponding to retroreflective panel 314 and/or retroreflective panel 316.

At block 704, the process 700 includes transmitting a plurality of LiDAR beams directed toward the sensor target panel, wherein the sensor target panel includes a first sensor target region that is associated with a first reflectivity value and a second sensor target region that is associated with a second reflectivity value. For instances, computer system 202 can use LiDAR sensor 206 to transmit a plurality of LiDAR beams directed toward target panel 302. In some aspects, target panel 302 can include a first sensor target region (e.g., sensor target region 304a) that is associated with a first reflectivity value and a second sensor target region (e.g., sensor target region 304b) that is associated with a second reflectivity value.

At block 706, the process 700 includes determining one or more LiDAR parameters based on a second set of LiDAR return signals corresponding to the sensor target panel. In some cases, the one or more LiDAR parameters include at least one of a first range measurement associated with the first sensor target region, a second range measurement associated with the second sensor target region, a first intensity measurement associated with the first sensor target region, a second intensity measurement associated with the second sensor target region, a range precision parameter, an intensity precision parameter, a first number of return signals from the second set of LiDAR return signals associated with the first sensor target region, and a second number of return signals from the second set of LiDAR return signals associated with the second sensor target region.

In some examples, the process 700 can include determining, based on a plurality of weather sensors, one or more weather conditions associated with the one or more LiDAR parameters. For example, computer system 202 can determine one or more weather conditions associated with one or more LiDAR parameters based on data from weather station 112. In some cases, the one or more weather conditions include at least one of rainfall, rain rate, fog, snow, sun, hail, lightning, humidity, temperature, cloudiness, ultraviolet (UV) index, wind chill, wind speed, and wind direction In some aspects, the process 700 can include capturing at least one image of the sensor target panel using a camera sensor, wherein the sensor target panel includes a line that separates the first sensor target region from the second sensor target region and determining one or more camera parameters based on the at least one image of the sensor target panel. For example, computer system 202 can use camera sensor 220 to capture at least one image of target panel 302. In some aspects, target panel 302 can include slanted line 306 that separates sensor target region 304a from sensor target region 304b. In some instances, the one or more camera parameters include one or more Modulation Transfer Function (MTF) measurements.

In some cases, the process 700 can include transmitting one or more RADAR signals directed toward a RADAR reflector coupled to the sensor target panel and determining one or more RADAR parameters based on one or more RADAR return signals reflected from the RADAR reflector. For example, computer system 202 can use RADAR sensor 204 to transmit RADAR signals toward RADAR reflector 322 and computer system 202 can determine one or more RADAR parameters based on RADAR return signals reflected from RADAR reflector 322. In some instances, the one or more RADAR parameters include at least one of a range measurement, a magnitude measurement, and a number of the one or more RADAR return signals.

Figure 8:
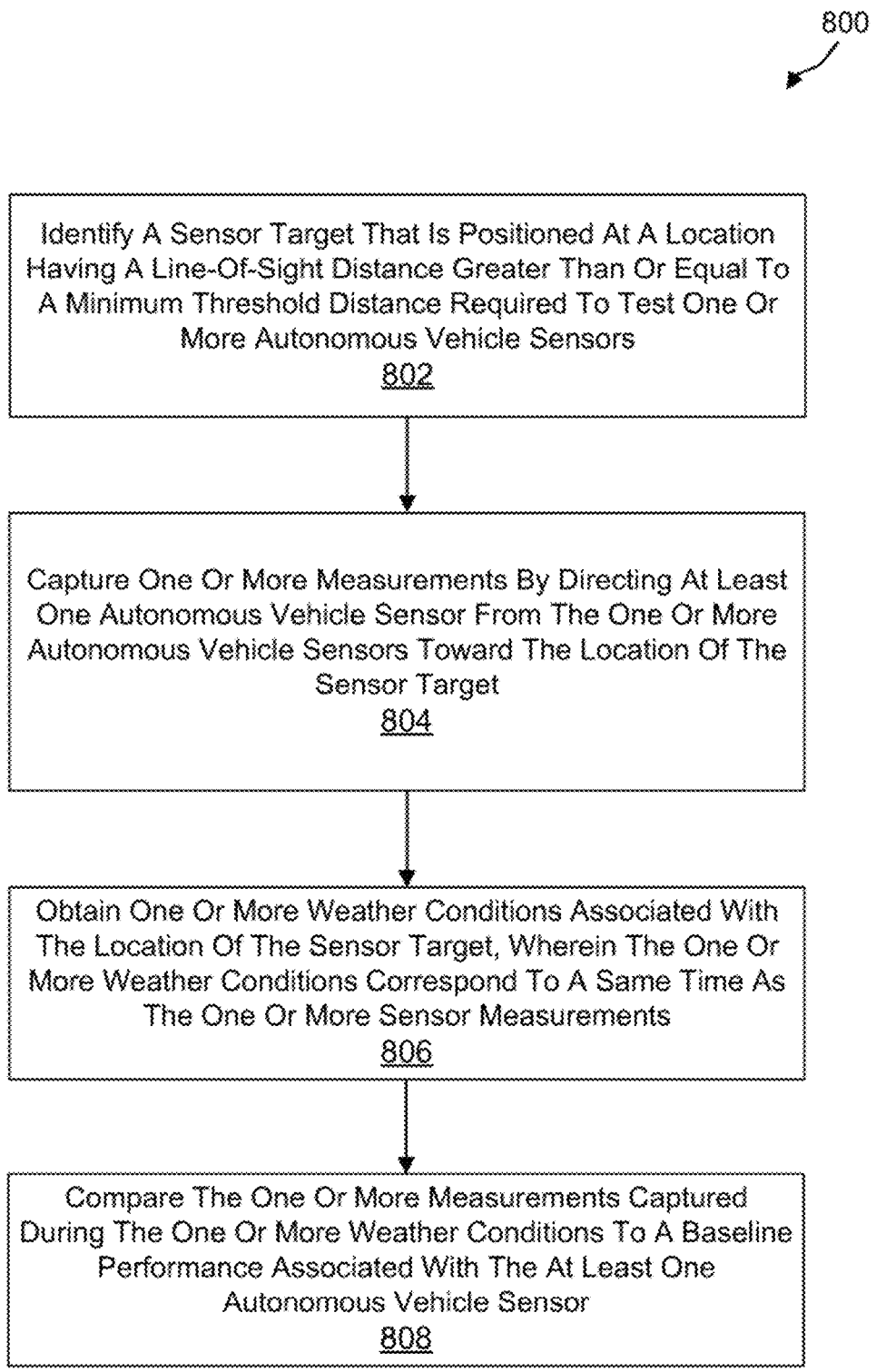
FIG. 8 illustrates an example of a process for performing long-range testing of autonomous vehicle sensors in varying weather conditions, according to some aspects of the present disclosure.

FIG. 8 illustrates an example of a process 800 for performing long-range testing of autonomous vehicle sensors in varying weather conditions. At block 802, the process 800 includes identifying a sensor target that is positioned at a location having a line-of-sight distance greater than or equal to a minimum threshold distance required to test one or more autonomous vehicle sensors. For example, computer system 202 associated with mobile test station 504 can identify sensor target 508 positioned on building 510 and having a line-of-sight distance suitable for performing AV sensor testing. In some cases, the minimum threshold distance can be 100 meters.

At block 804, the process 800 includes capturing one or more sensor measurements by directing at least one autonomous vehicle sensor from the one or more autonomous vehicle sensors towards the location of the sensor target. For example, mobile test station 504 can be used to capture one or more sensor measurements by directing an AV sensor (e.g., LiDAR sensor, RADAR sensor, camera sensor, etc.) to the location of sensor target 508. In some examples, the one or more sensor measurements include at least one of a LiDAR range measurement, a LiDAR intensity measurement, a camera Modulation Transfer Function (MTF) measurement, a RADAR range measurement, and a RADAR magnitude measurement.

At block 806, the process 800 includes obtaining one or more weather conditions associated with the location of the sensor target, wherein the one or more weather conditions correspond to a same time as the one or more sensor measurements. For example, the computer system associated with mobile test station 504 can obtain weather condition (e.g., from weather station 112) that correspond to the same time as the sensor measurements. In some instances, the one or more weather conditions include at least one of rainfall, rain rate, fog, snow, sun, hail, lightning, humidity, temperature, cloudiness, ultraviolet (UV) index, wind chill, wind speed, and wind direction.

At block 808, the process 800 includes comparing the one or more sensor measurements captured during the one or more weather conditions to a baseline performance associated with the at least one autonomous vehicle sensor. For instance, the computer system associated with mobile test station 504 can compare the measurements to a baseline performance associated with the AV sensor that is being tested. In some aspects, the baseline performance is associated with a set of sensor measurements captured using the sensor target during optimal (e.g., clear) weather conditions.

In some examples, the at least one autonomous vehicle sensor is coupled to at least one of an autonomous vehicle, a mobile weather test station, and a roof-top weather station. For example, the at least one AV sensor may be coupled to AV 502, mobile weather station 504, or rooftop test station 506.

In some aspects, the process 800 may include determining a weather calibration factor for the at least one autonomous vehicle sensor based on a difference between the one or more sensor measurements captured during the one or more weather conditions and the baseline performance. For example, the computer system (e.g., computer system 202) associated with mobile test station 504 can determine a weather calibration factor for the AV sensor based on a difference between the measurements and the expected baseline performance. In some cases, the weather calibration factor is used by a perception stack of an autonomous vehicle to process sensor data obtained from the at least one autonomous vehicle sensor during the one or more weather conditions. In one illustrative example, the weather calibration factor may be used by perception stack 912 to process LiDAR measurements in foggy conditions.

Figure 9:
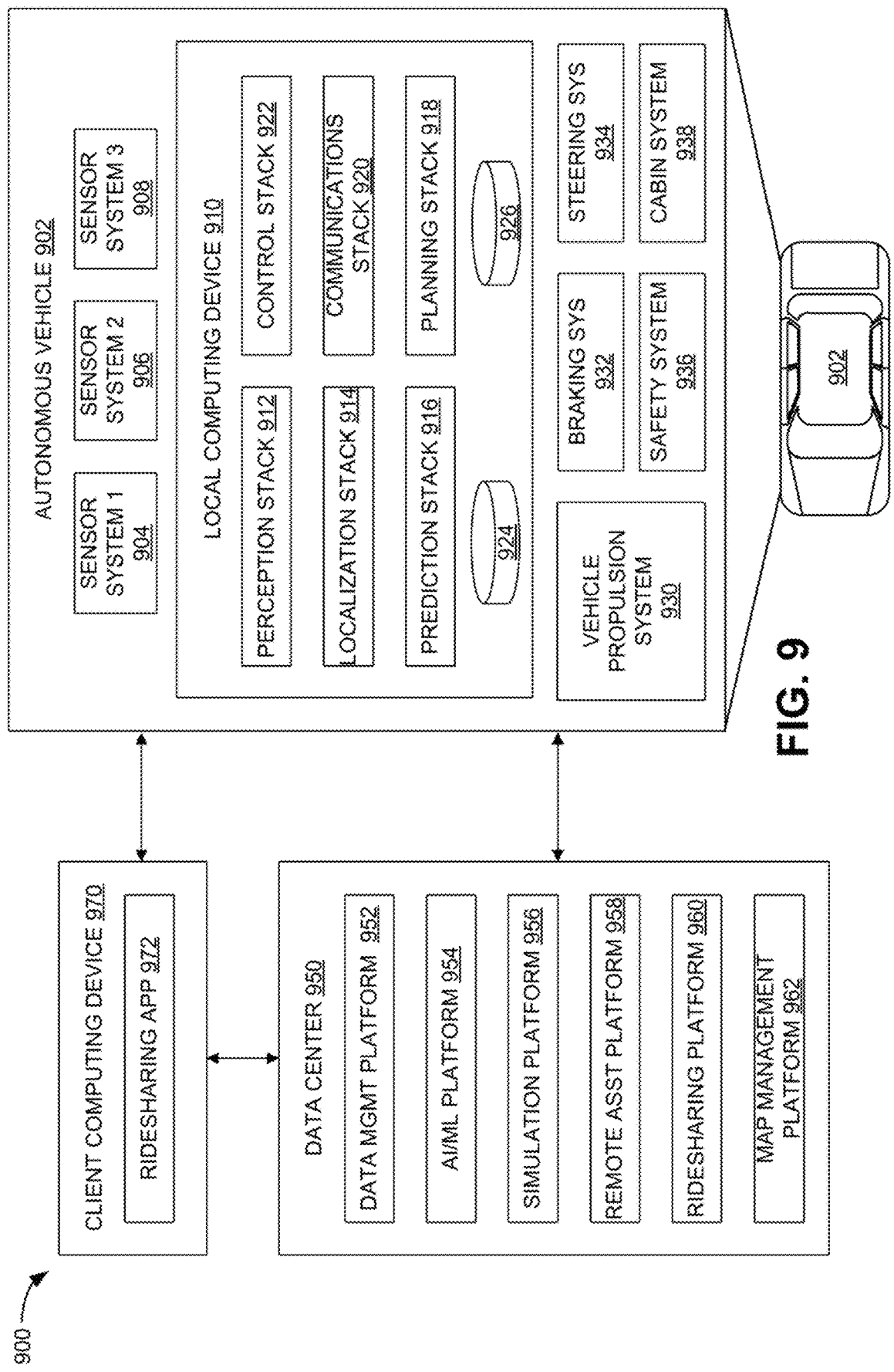
FIG. 9 illustrates an example system environment that can be used to facilitate autonomous vehicle (AV) navigation and routing operations, according to some aspects of the present disclosure.

FIG. 9 illustrates an example of an AV management system 900. One of ordinary skill in the art will understand that, for the AV management system 900 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill in the art will appreciate that such variations do not depart from the scope of the present disclosure.

In this example, the AV management system 900 includes an AV 902, a data center (also autonomous vehicle fleet management device, autonomous vehicle fleet management system, management system) 950, and a client computing device 970. The AV 902, the data center 950, and the client computing device 970 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 902 can navigate roadways without a human driver based on sensor signals generated by multiple sensor systems 904, 906, and 908. The sensor systems 904-908 can include different types of sensors and can be arranged about the AV 902. For instance, the sensor systems 904-908 can comprise Inertial Measurement Units (IMUs), cameras (e.g., still image cameras, video cameras, etc.), light sensors (e.g., LiDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 904 can be a camera system, the sensor system 906 can be a LiDAR system, and the sensor system 908 can be a RADAR system. Other embodiments may include any other number and type of sensors.

AV 902 can also include several mechanical systems that can be used to maneuver or operate AV 902. For instance, the mechanical systems can include a vehicle propulsion system 930, a braking system 932, a steering system 934, a safety system 936, and a cabin system 938, among other systems. The vehicle propulsion system 930 can include an electric motor, an internal combustion engine, or both. The braking system 932 can include an engine brake, brake pads, actuators, and/or any other suitable componentry configured to assist in decelerating the AV 902. The steering system 934 can include suitable componentry configured to control the direction of movement of the AV 902 during navigation. The safety system 936 can include lights and signal indicators, a parking brake, airbags, and so forth. The cabin system 938 can include cabin temperature control systems, in-cabin entertainment systems, and so forth. In some embodiments, the AV 902 might not include human driver actuators (e.g., steering wheel, handbrake, foot brake pedal, foot accelerator pedal, turn signal lever, window wipers, etc.) for controlling the AV 902. Instead, the cabin system 938 can include one or more client interfaces (e.g., Graphical User Interfaces (GUIs), Voice User Interfaces (VUIs), etc.) for controlling certain aspects of the mechanical systems 930-938.

The AV 902 can additionally include a local computing device 910 that is in communication with the sensor systems 904-908, the mechanical systems 930-938, the data center 950, and the client computing device 970, among other systems. The local computing device 910 can include one or more processors and memory, including instructions that can be executed by the one or more processors. The instructions can make up one or more software stacks or components responsible for controlling the AV 902; communicating with the data center 950, the client computing device 970, and other systems; receiving inputs from riders, passengers, and other entities within the AV's environment; logging metrics collected by the sensor systems 904-908; and so forth. In this example, the local computing device 910 includes a perception stack 912, a mapping and localization stack 914, a prediction stack 916, a planning stack 918, a communications stack 920, a control stack 922, an AV operational database 924, and an HD geospatial database 926, among other stacks and systems.

The perception stack 912 can enable the AV 902 to "see" (e.g., via cameras, LiDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 904-908, the mapping and localization stack 914, the HD geospatial database 926, other components of the AV, and other data sources (e.g., the data center 950, the client computing device 970, third party data sources, etc.). The perception stack 912 can detect and classify objects and determine their current locations, speeds, directions, and the like. In addition, the perception stack 912 can determine the free space around the AV 902 (e.g., to maintain a safe distance from other objects, change lanes, park the AV, etc.). Perception stack 912 can also identify environmental uncertainties, such as where to look for moving objects, flag areas that may be obscured or blocked from view, and so forth. In some embodiments, an output of the prediction stack 916 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 914 can determine the AV's position and orientation (pose) using different methods from multiple systems (e.g., GPS, IMUs, cameras, LiDAR, RADAR, ultrasonic sensors, the HD geospatial database 926, etc.). For example, in some embodiments, the AV 902 can compare sensor data captured in real-time by the sensor systems 904-908 to data in the HD geospatial database 926 to determine its precise (e.g., accurate to the order of a few centimeters or less) position and orientation. The AV 902 can focus its search based on sensor data from one or more first sensor systems (e.g., GPS) by matching sensor data from one or more second sensor systems (e.g., LiDAR). If the mapping and localization information from one system is unavailable, the AV 902 can use mapping and localization information from a redundant system and/or from remote data sources.

The prediction stack 916 can receive information from the mapping and localization stack 914 and objects identified by the perception stack 912 and predict a future path for the objects. In some embodiments, the prediction stack 916 can output several likely paths that an object is predicted to take along with a probability associated with each path. For each predicted path, the prediction stack 916 can also output a range of points along the path corresponding to a predicted location of the object along the path at future time intervals along with an expected error value for each of the points that indicates a probabilistic deviation from that point.

Planning stack 918 can determine how to maneuver or operate the AV 902 safely and efficiently in its environment. For example, the planning stack 918 can receive the location, speed, and direction of the AV 902, geospatial data, data regarding objects sharing the road with the AV 902 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 902 from one point to another and outputs from the perception stack 912, mapping and localization stack 914, and prediction stack 916. The planning stack 918 can determine multiple sets of one or more mechanical operations that the AV 902 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 918 can select from multiple backup plans to carry out. For example, while preparing to change lanes to turn right at an intersection, another vehicle may aggressively cut into the destination lane, making the lane change unsafe. The planning stack 918 could have already determined an alternative plan for such an event. Upon its occurrence, it could help direct the AV 902 to go around the block instead of blocking a current lane while waiting for an opening to change lanes.

The control stack 922 can manage the operation of the vehicle propulsion system 930, the braking system 932, the steering system 934, the safety system 936, and the cabin system 938. The control stack 922 can receive sensor signals from the sensor systems 904-908 as well as communicate with other stacks or components of the local computing device 910 or a remote system (e.g., the data center 950) to effectuate operation of the AV 902. For example, the control stack 922 can implement the final path or actions from the multiple paths or actions provided by the planning stack 918. This can involve turning the routes and decisions from the planning stack 918 into commands for the actuators that control the AV's steering, throttle, brake, and drive unit.

The communications stack 920 can transmit and receive signals between the various stacks and other components of the AV 902 and between the AV 902, the data center 950, the client computing device 970, and other remote systems. The communications stack 920 can enable the local computing device 910 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 920 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 926 can store HD maps and related data of the streets upon which the AV 902 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 924 can store raw AV data generated by the sensor systems 904-908, stacks 912-922, and other components of the AV 902 and/or data received by the AV 902 from remote systems (e.g., the data center 950, the client computing device 970, etc.). In some embodiments, the raw AV data can include HD LiDAR point cloud data, image data, RADAR data, GPS data, and other sensor data that the data center 950 can use for creating or updating AV geospatial data or for creating simulations of situations encountered by AV 902 for future testing or training of various machine learning algorithms that are incorporated in the local computing device 910.

The data center 950 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 950 can include one or more computing devices remote to the local computing device 910 for managing a fleet of AVs and AV-related services. For example, in addition to managing the AV 902, the data center 950 may also support a ridesharing service, a delivery service, a remote/roadside assistance service, street services (e.g., street mapping, street patrol, street cleaning, street metering, parking reservation, etc.), and the like.

The data center 950 can send and receive various signals to and from the AV 902 and the client computing device 970. These signals can include sensor data captured by the sensor systems 904-908, roadside assistance requests, software updates, ridesharing pick-up and drop-off instructions, and so forth. In this example, the data center 950 includes a data management platform 952, an Artificial Intelligence/Machine Learning (AI/ML) platform 954, a simulation platform 956, a remote assistance platform 958, a ridesharing platform 960, and a map management platform 962, among other systems.

The data management platform 952 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 950 can access data stored by the data management platform 952 to provide their respective services.

The AI/ML platform 954 can provide the infrastructure for training and evaluating machine learning algorithms for operating the AV 902, the simulation platform 956, the remote assistance platform 958, the ridesharing platform 960, the map management platform 962, and other platforms and systems. Using the AI/ML platform 954, data scientists can prepare data sets from the data management platform 952; select, design, and train machine learning models; evaluate, refine, and deploy the models; maintain, monitor, and retrain the models; and so on.

The simulation platform 956 can enable testing and validation of the algorithms, machine learning models, neural networks, and other development efforts for the AV 902, the remote assistance platform 958, the ridesharing platform 960, the map management platform 962, and other platforms and systems. The simulation platform 956 can replicate a variety of driving environments and/or reproduce real-world scenarios from data captured by the AV 902, including rendering geospatial information and road infrastructure (e.g., streets, lanes, crosswalks, traffic lights, stop signs, etc.) obtained from a cartography platform (e.g., map management platform 962); modeling the behavior of other vehicles, bicycles, pedestrians, and other dynamic elements; simulating inclement weather conditions, different traffic scenarios; and so on.

The remote assistance platform 958 can generate and transmit instructions regarding the operation of the AV 902. For example, in response to an output of the AI/ML platform 954 or other system of the data center 950, the remote assistance platform 958 can prepare instructions for one or more stacks or other components of the AV 902.

The ridesharing platform 960 can interact with a customer of a ridesharing service via a ridesharing application 972 executing on the client computing device 970. The client computing device 970 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 972. The client computing device 970 can be a customer's mobile computing device or a computing device integrated with the AV 902 (e.g., the local computing device 910). The ridesharing platform 960 can receive requests to pick up or drop off from the ridesharing application 972 and dispatch the AV 902 for the trip.

Map management platform 962 can provide a set of tools for the manipulation and management of geographic and spatial (geospatial) and related attribute data. The data management platform 952 can receive LiDAR point cloud data, image data (e.g., still image, video, etc.), RADAR data, GPS data, and other sensor data (e.g., raw data) from one or more AVs 902, Unmanned Aerial Vehicles (UAVs), satellites, third-party mapping services, and other sources of geospatially referenced data. The raw data can be processed, and map management platform 962 can render base representations (e.g., tiles (2D), bounding volumes (3D), etc.) of the AV geospatial data to enable users to view, query, label, edit, and otherwise interact with the data. Map management platform 962 can manage workflows and tasks for operating on the AV geospatial data. Map management platform 962 can control access to the AV geospatial data, including granting or limiting access to the AV geospatial data based on user-based, role-based, group-based, task-based, and other attribute-based access control mechanisms. Map management platform 962 can provide version control for the AV geospatial data, such as to track specific changes that (human or machine) map editors have made to the data and to revert changes when necessary. Map management platform 962 can administer release management of the AV geospatial data, including distributing suitable iterations of the data to different users, computing devices, AVs, and other consumers of HD maps. Map management platform 962 can provide analytics regarding the AV geospatial data and related data, such as to generate insights relating to the throughput and quality of mapping tasks.

In some embodiments, the map viewing services of map management platform 962 can be modularized and deployed as part of one or more of the platforms and systems of the data center 950. For example, the AI/ML platform 954 may incorporate the map viewing services for visualizing the effectiveness of various object detection or object classification models, the simulation platform 956 may incorporate the map viewing services for recreating and visualizing certain driving scenarios, the remote assistance platform 958 may incorporate the map viewing services for replaying traffic incidents to facilitate and coordinate aid, the ridesharing platform 960 may incorporate the map viewing services into the client application 972 to enable passengers to view the AV 902 in transit en route to a pick-up or drop-off location, and so on.

Figure 10:
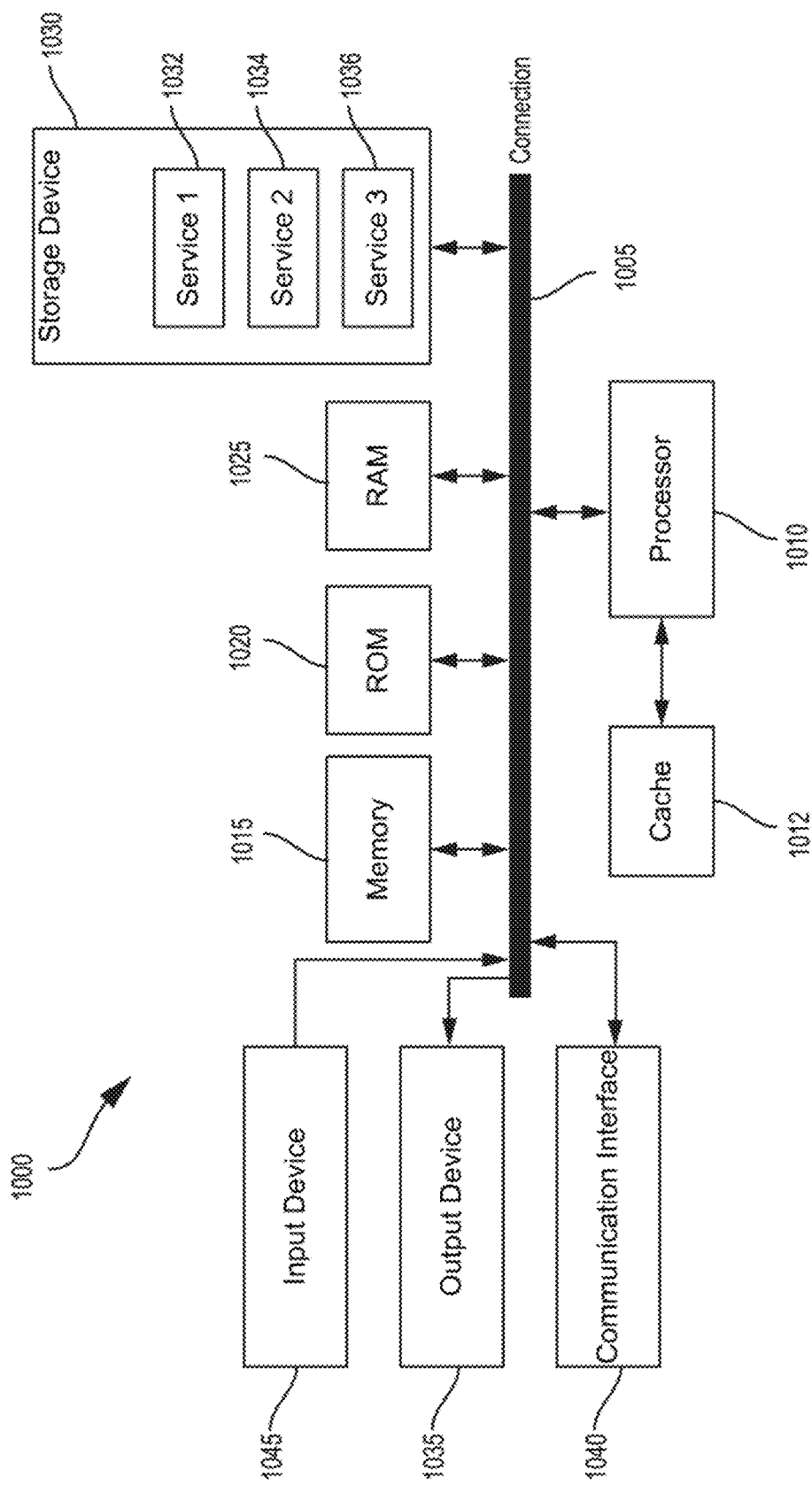
FIG. 10 illustrates an example processor-based system with which some aspects of the subject technology can be implemented, according to some aspects of the present disclosure.

FIG. 10 illustrates an example processor-based system with which some aspects of the subject technology can be implemented. For example, processor-based system 1000 can be any computing device making up, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (Central Processing Unit (CPU) or processor) 1010 and connection 1005 that couples various system components including system memory 1015, such as Read-Only Memory (ROM) 1020 and Random-Access Memory (RAM) 1025 to processor 1010. Computing system 1000 can include a cache of high-speed memory 1012 connected directly with, in close proximity to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick R card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 1030 can include software services, servers, services, etc., that when the code that defines such software is executed by the processor 1010, it causes the system 1000 to perform a function. In some embodiments, a hardware service that performs a particular function can include the software component stored in a computer-readable medium in connection with the necessary hardware components, such as processor 1010, connection 1005, output device 1035, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An apparatus for testing autonomous vehicle sensors, comprising:
    a target panel having a substantially planar surface that includes a plurality of sensor target regions, wherein a first sensor target region of the plurality of sensor target regions is associated with a first reflectivity value and a second sensor target region of the plurality of sensor target regions is associated with a second reflectivity value;
    a line on the substantially planar surface that separates the first sensor target region from the second sensor target region; and
    one or more support members coupled to the target panel, wherein the one or more support members are configured to maintain the target panel in an upright position.

2. The apparatus of claim 1, further comprising:
    a first retroreflective panel coupled to a first side of the target panel; and
    a second retroreflective panel coupled to a second side of the target panel, wherein the first side of the target panel is opposite the second side of the target panel.

3. The apparatus of claim 2, wherein the first retroreflective panel and the second retroreflective panel are equidistant from the target panel.

4. The apparatus of claim 2, wherein the first retroreflective panel and the second retroreflective panel are each configurable to a first position substantially parallel with the target panel and a second position disposed behind the target panel.

5. The apparatus of claim 1, further comprising:
a Radio Detection and Ranging (RADAR) reflector coupled to the target panel.

6. The apparatus of claim 1, wherein the first sensor target region includes a black vinyl material, and the second sensor target region includes a white vinyl material.

7. The apparatus of claim 1, wherein the line on the substantially planar surface is slanted at an angle that is greater than or equal to 6 degrees from a vertical axis of the substantially planar surface.

8. The apparatus of claim 1, wherein the target panel and the one or more support members are formed using one or more non-metallic materials.

9. A method for testing autonomous vehicle sensors, comprising:
identifying a sensor target panel based on a first set of Light Detection and Ranging (LiDAR) return signals corresponding to at least one retroreflective panel associated with the sensor target panel;
transmitting a plurality of LiDAR beams directed toward the sensor target panel, wherein the sensor target panel includes a first sensor target region that is associated with a first reflectivity value and a second sensor target region that is associated with a second reflectivity value; and
determining one or more LiDAR parameters based on a second set of LiDAR return signals corresponding to the sensor target panel.

10. The method of claim 9, wherein the one or more LiDAR parameters include at least one of a first range measurement associated with the first sensor target region, a second range measurement associated with the second sensor target region, a first intensity measurement associated with the first sensor target region, a second intensity measurement associated with the second sensor target region, a range precision parameter, an intensity precision parameter, a first number of return signals from the second set of LiDAR return signals associated with the first sensor target region, and a second number of return signals from the second set of LiDAR return signals associated with the second sensor target region.

11. The method of claim 10, further comprising:
transmitting one or more RADAR signals directed toward a RADAR reflector coupled to the sensor target panel; and
determining one or more RADAR parameters based on one or more RADAR return signals reflected from the RADAR reflector.

12. The method of claim 11, wherein the one or more RADAR parameters include at least one of a range measurement, a magnitude measurement, and a number of the one or more RADAR return signals.

13. The method of claim 10, further comprising:
determining, based on a plurality of weather sensors, one or more weather conditions associated with the one or more LiDAR parameters.

14. The method of claim 13, wherein the one or more weather conditions include at least one of rainfall, rain rate, fog, snow, sun, hail, lightning, humidity, temperature, cloudiness, ultraviolet (UV) index, wind chill, wind speed, and wind direction.

15. The method of claim 9, further comprising:
capturing at least one image of the sensor target panel using a camera sensor, wherein the sensor target panel includes a line that separates the first sensor target region from the second sensor target region; and
determining one or more camera parameters based on the at least one image of the sensor target panel.

16. The method of claim 15, wherein the one or more camera parameters include one or more Modulation Transfer Function (MTF) measurements.

17. A non-transitory computer-readable storage medium comprising at least one instruction for causing a computer or processor to:
identify a sensor target panel based on a first set of Light Detection and Ranging (LiDAR) return signals corresponding to at least one retroreflective panel associated with the sensor target panel;
send a plurality of LiDAR beams directed toward the sensor target panel, wherein the sensor target panel includes a first sensor target region that is associated with a first reflectivity value and a second sensor target region that is associated with a second reflectivity value; and
determine one or more LiDAR parameters based on a second set of LiDAR return signals corresponding to the sensor target panel.

18. The non-transitory computer-readable storage medium of claim 17, wherein the computer or processor is further configured to:
capture at least one image of the sensor target panel using a camera sensor, wherein the sensor target panel includes a line that separates the first sensor target region from the second sensor target region; and
determine one or more camera parameters based on the at least one image of the sensor target panel.

19. The non-transitory computer-readable storage medium of claim 17, wherein the computer or processor is further configured to:
send one or more RADAR signals directed toward a RADAR reflector coupled to the sensor target panel; and
determine one or more RADAR parameters based on one or more RADAR return signals reflected from the RADAR reflector.

20. The non-transitory computer-readable storage medium of claim 17, wherein the computer or processor is further configured to:
determine, based on a plurality of weather sensors, one or more weather conditions associated with the one or more LiDAR parameters.

\* \* \* \* \*